(12) United States Patent
Kreider et al.

(10) Patent No.: US 8,180,948 B2
(45) Date of Patent: May 15, 2012

(54) TWO-WIRE LOOP PROCESS IO TRANSMITTER POWERED FROM THE TWO-WIRE LOOP

(75) Inventors: Aaron Richard Kreider, Elizabethtown, PA (US); Davis Mathews, Lewisberry, PA (US); Brian James Vogt, Harrisburg, PA (US)

(73) Assignee: Phoenix Contact America, Inc., Middletown, PA (US)

( * ) Notice: Subject to any disclaimer, the term of this patent is extended or adjusted under 35 U.S.C. 154(b) by 413 days.

(21) Appl. No.: 12/499,938

(22) Filed: Jul. 9, 2009

(65) Prior Publication Data

US 2011/0010476 A1    Jan. 13, 2011

(51) Int. Cl.
G06F 13/36 (2006.01)
G06F 13/20 (2006.01)
G06F 1/00 (2006.01)
(52) U.S. Cl. .................. 710/313; 710/306; 713/300
(58) Field of Classification Search ............ 710/1, 2, 710/306, 313, 314, 315; 713/300
See application file for complete search history.

(56) References Cited

U.S. PATENT DOCUMENTS

| | | | | |
|---|---|---|---|---|
| 5,775,955 A | * | 7/1998 | Graube et al. | 439/717 |
| 6,424,872 B1 | * | 7/2002 | Glanzer et al. | 700/18 |
| 6,574,515 B1 | | 6/2003 | Kirkpatrick et al. | |
| 7,974,058 B2 | * | 7/2011 | Maigret et al. | 361/63 |
| 2003/0212529 A1 | * | 11/2003 | Bibelhausen et al. | 702/188 |
| 2005/0108442 A1 | * | 5/2005 | Aschenbrenner | 710/1 |
| 2007/0019560 A1 | | 1/2007 | Brewer et al. | |
| 2007/0198749 A1 | * | 8/2007 | Vazach | 710/2 |
| 2008/0013226 A1 | | 1/2008 | Kirst | |
| 2008/0168283 A1 | | 7/2008 | Penning | |
| 2009/0023320 A1 | * | 1/2009 | De Carolis et al. | 439/190 |
| 2009/0104814 A1 | | 4/2009 | Weiss et al. | |
| 2009/0215324 A1 | * | 8/2009 | Rogoll et al. | 439/717 |

FOREIGN PATENT DOCUMENTS

| | | |
|---|---|---|
| EP | 1942600 A1 | 7/2008 |
| EP | 2053697 | 4/2009 |
| WO | WO 0188644 A2 * | 11/2001 |
| WO | WO 2007012014 A2 | 1/2007 |

OTHER PUBLICATIONS

European Patent Office, International Search Report in International Patent Application No. PCT/IB2010/001684 (Nov. 4, 2010).

* cited by examiner

Primary Examiner — Thomas J Cleary
(74) Attorney, Agent, or Firm — Leydig, Voit & Mayer, Ltd.

(57) ABSTRACT

A two-wire process input-output ("IO") transmitter powered by a two-wire process loop and configured as a single transmitter. The transmitter including a gateway module and at least one local IO module. The gateway module including a first circuit configured to wholly power the gateway module from the two-wire process loop, a second circuit configured to communicate via the two-wire process loop, and a third circuit configured to communicate with the at least one IO module via a local bus separated from the two-wire process loop. The at least one local IO module including a first circuit configured to wholly power the respective local IO module from the two-wire process loop, a second circuit to communicate at least with the gateway module via the local bus, and a third circuit configured to interface with at least one IO field device.

22 Claims, 5 Drawing Sheets

TWO-WIRE LOOP PROCESS IO TRANSMITTER POWERED FROM THE TWO-WIRE LOOP

FIELD

The present invention relates to a two-wire loop process IO transmitter powered from the two-wire loop. More specifically, the present invention relates to a two-wire loop process IO transmitter powered from the two-wire loop including at least two field-mountable modules connectable to each other.

BACKGROUND

Generally, two-wire loop process IO transmitters powered from the two-wire loop are used, to communicate between a process control and input and/or output (IO) field-devices, such as actuators and sensors, via the two-wire loop of a two-wire process control loop for controlling and/or monitoring IO points of the process.

In this regard the IO transmitters are adapted to operate on a two-wire loop being of a communication type in accordance with Foundation Fieldbus or with Profibus-PA but is not limited thereto.

Based thereon, the two-wire loops are commonly used for connecting a number of IO transmitters for facilitating the control and monitoring of certain IO points of an industrial process by IO field devices connected to the transmitters provided with respective IO interface ports. Thereby, the transmitters receive their power from the two-wire process control loop and being adapted to communicate over the two-wire process control loop with a central controller, such as a host. Thus, the two-wire loop is designed such that a transmitter receives its power from the two-wire loop as well as communicates on the two wire loop, wherein the two-wire loop is designed such that communication may occur without disrupting the provision of power to all transmitters attached to the loop. For facilitating the controlling and monitoring of IO points of a such process the transmitters are usually placed near the real industrial process and provide access to a plurality of process variables associated with IO field devices connected to the IO interface ports of the transmitters by transmitting digitized data over the two-wire loop to the central controller typically located at a greater distance away from the process, for example in a control room, than the transmitters, as it is schematically depicted in the attached FIG. 5.

FIG. 5 shows three transmitters all of which are connected to a common two-wire loop of a central controller located far away in a control room. Each of the transmitters includes an IO field device interface port to interface with a certain IO field device and to operate and/or transmit electrical signals relating to physical process conditions at the respective IO point that are to be controlled and monitored. In this regard, an IO field device can be an actor or sensor, such as a limit switch, a valve controller, a heater, a motor, a level indicator and an other IO field device. Hence, the nature of the data operated and/or transmitted by such a transmitter are for example temperature data, level data and flow data received from an IO field device being for example an input sensor field device to which the respective interface port is connected, and also can be of discrete inputs and outputs such as for example "stop data" and "go data" related for example to an IO field device being an output actor field device, for example motors. According to the state of the art, each of the three transmitters has its own power circuit integrated to receive power via the two-wire loop.

The more the central controller is located away from the real industrial process, there is the need to build up long cable runs in two-wire loop installations. Due to cable resistance however and based on the current draw and operating voltage of each of the transmitters necessary to control and monitor the IO points, the maximal length the cable runs are limited.

In addition, a further limitation in two-wire loop systems is given by the maximal number of IO transmitters that can be added to a single two-wire loop. Usually, a central controller or host and the process system controlled thereby have a practical limit of the number of IO transmitters that can be connected therewith. Such a practical limit is typically about sixteen connectable transmitters. As a consequence, this constraint also is limiting the number of IO field or process points that a single two-wire loop can capture, i.e. control and monitor, by IO field devices connected with the IO transmitters. Again as a result, several manufacturers offer IO transmitters with multiple IO interface ports multiplexed for data transmission over common channels by a single IO transmitter. A such IO transmitter is schematically shown for example in the attached FIG. 6. FIG. 6 is depicting a single IO transmitter connected to a two-wire loop of a two-wire process loop for receiving power from and for communicating with the central controller and having a multiplexer for multiplexing eight IO interface ports on a single channel as well as a single or common power circuit for wholly powering all of the eight IO interface ports with power received from the two-wire loop and a communication circuit for performing the entire communication. Even the incorporation of more than one multiplexer into a single IO transmitter having a single or common power circuit for wholly powering the entire transmitter is possible. Such a single IO transmitter having a single or common power circuit for wholly powering the entire transmitter described for example in U.S. Pat. No. 6,574,515.

EP 2053 697 and US 2009/0104814 describe common backplane type connection systems.

Depending on the adaptation of a respective IO transmitter to operate by means of a certain protocol, such as based on a communication protocol type according to Foundation Fieldbus or according to Profibus-PA but even on an other communication protocol type, usually the respective protocol used requires that a transmitter maintain a constant current draw from the two-wire loop. Thus, as existing two-wire loop-powered IO transmitters for interfacing with IO field devices contain a predefined number of IO ports, a fixed power consumption from the two-wire loop is needed. This however also limits the maximal length of cable runs.

Additional limitations are unnecessarily imposed on the user by existing IO transmitters often resulting in inefficient system designs.

For example, in case an IO transmitter is constructed as being a two-wire loop powered valves coupler and may have four IO interface ports providing the capability to interface with four valves, then a such valve coupler according to the state of the art draws the power from the two-wire loop necessary to interface with all four valves. Many industrial process applications however, often have more or less than four valves. As a first consequence, in case of only three valves have to be interfaced, the valve coupler nevertheless will draw the current necessary to interface with four valves regardless of whether or not a forth valve has to be interfaced by the IO transmitter. Thus in this case the described IO transmitter is inefficient for use.

In a case of an industrial process application however, according to which five valves for example have to be interfaced, a second transmitter of the afore-described type is needed in order to connect all five valves to the two-wire loop.

In addition to the inefficiency of now powering eight valve interface ports instead of only five as needed, these two IO transmitters have to be commissioned on the central controller for operating the valves, thus increasing the number of IO transmitters connected to the controller. Because of the practical limit impost by the controller relating to the maximal number of IO transmitters that can be added to the two-wire loop, the IO transmitter described, i.e. having four IO valve interface ports, is not ideal matched even in such a case.

As a consequence, in today's large process installations, inefficiencies and challenges can result in unnecessary complexity and costs.

SUMMARY

An aspect of the present invention is to provide a two-wire loop powered IO transmitter merely consuming low power as necessary and thereby enabling a more maximized cable run length.

Another, alternative, aspect of the present invention is to provide a two-wire loop powered IO transmitter enabling more efficiency in multiplexing signals.

In an embodiment, the present invention provides a two-wire process input-output ("IO") transmitter powered by a two-wire process loop and configured as a single transmitter. The transmitter includes a gateway module and at least one local IO module. The gateway module includes a first circuit configured to wholly power the gateway module from the two-wire process loop without powering any other module from the two-wire process loop, a second circuit configured to communicate via the two-wire process loop, and a third circuit configured to communicate with the at least one IO module via a local bus separated from the two-wire process loop. Each of the at least one local IO module includes a first circuit configured to wholly power the respective local IO module from the two-wire process loop without powering any other module from the two-wire process loop, a second circuit to communicate at least with the gateway module via the local bus, and a third circuit configured to interface with at least one IO field device.

BRIEF DESCRIPTION OF THE DRAWINGS

Further features and advantages are described below based on exemplary embodiments taken into account the drawings accompanied, in which.

DETAILED DESCRIPTION

Figure 1:
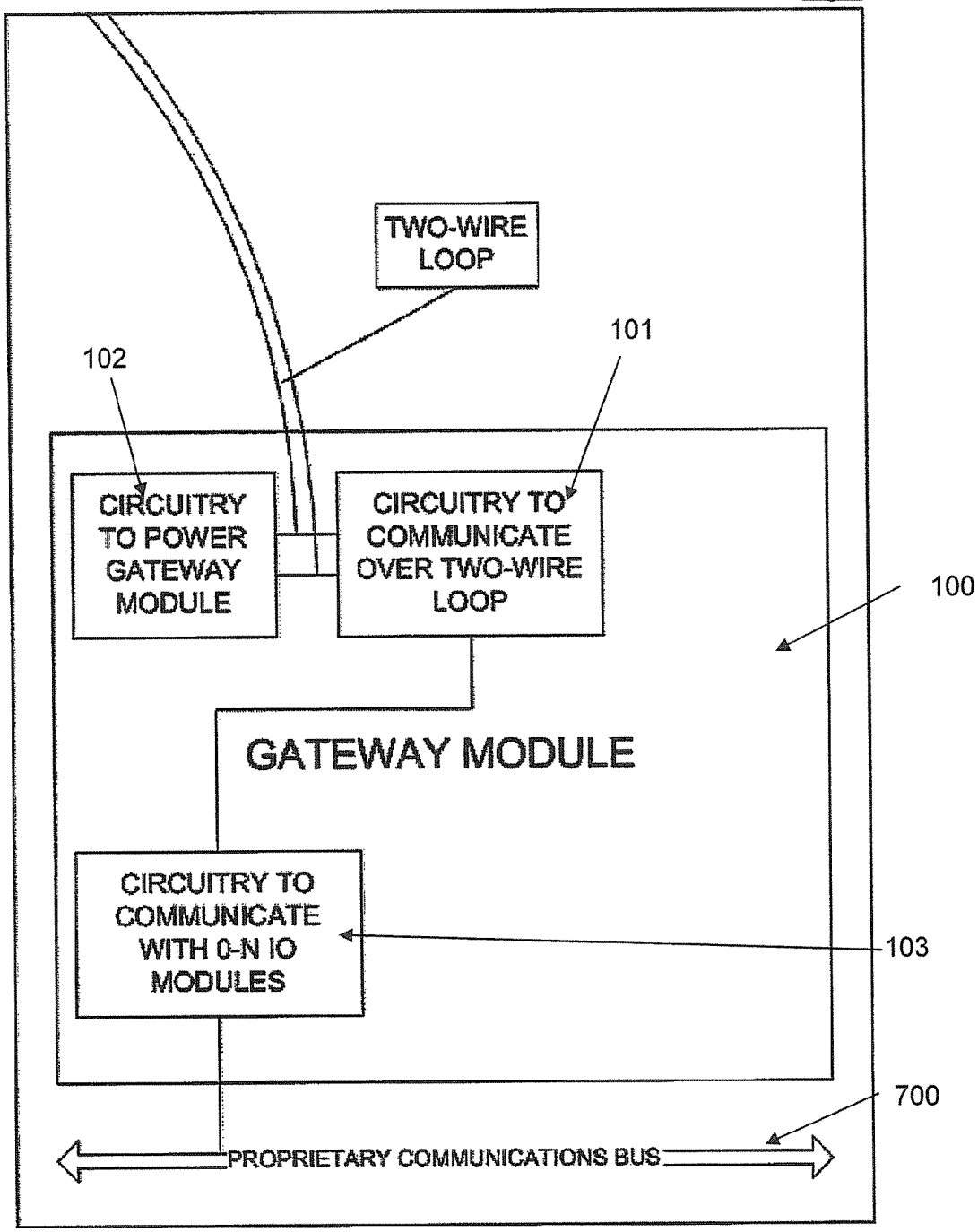
FIG. 1 is block diagram of a gateway module incorporated within a single two-wire loop process IO transmitter powered from the two-wire loop according to an embodiment of the present invention, the gateway module comprises a circuitry to wholly power itself from a two-wire process loop without powering any other module from the two-wire process loop, a circuitry to communicate on the two-wire process loop and a circuitry to communicate with a number of IO modules over a local bus separated from the two-wire loop.

A two-wire loop process IO transmitter powered from the two-wire loop is provided with said IO transmitter functioning as a single transmitter and including at least two modules. The first module being designed as a gateway module and at least one further module being designed as a local IO module. The gateway module including a circuitry to power itself from a two-wire process loop without powering any other module from the two-wire process loop, a circuitry to communicate on the two-wire process loop and a circuitry to communicate with a number of IO modules over a local bus separated from the two-wire loop, and wherein each of the IO modules comprising a circuitry to wholly power itself from a two-wire process loop without powering any other module from the two-wire process loop, a circuitry to communicate at least with a gateway module over a local bus separated from the two-wire loop and a circuitry to interface with at least one IO field device.

As a consequence, advantages of the present invention are to allow a user to customize a single two-wire loop process IO transmitter powered from the two-wire loop to process application specific needs and to scale the capability of the single two-wire loop process IO transmitter powered from the two-wire loop as the needs in the process change. By offering the customer a modular two-wire loop process IO transmitter powered from the two-wire loop consisting of one gateway module for interfacing with the two-wire process loop and of a user selected number of IO modules for interfacing with IO field devices, each of the modules having its own power circuit, one is able to flexibly choose the number IO interface ports that are multiplexed through a single two-wire loop process IO transmitter powered from the two-wire loop enabling to construct a single two-wire loop process IO transmitter powered from the two-wire loop capable of interfacing for example with exactly three valves or five valves, thus maximizing power efficiency and multiplexing efficiency.

The present invention also offers flexibility in interfacing with multiple types of IO field devices such as for example 3 valves and 2 temperature IO field devices by merely modularly constructing a single two-wire loop process IO transmitter powered from the two-wire loop consisting of one gateway module and at least one IO module constructed as an IO valves interfacing module and at least one IO module constructed as an IO temperature interfacing module for being capable of multiplexing 3 valve interface ports and 2 temperature interface ports. Moreover in case additional IO field devices should be added for capturing further IO process points by the two-wire loop after the process has been commissioned and is operational, additional interface ports are needed, such as for example two more temperature interface ports, and respective IO modules may be added at any time to the single two-wire loop process IO transmitter powered from the two-wire loop for enhancing its capacity.

Furthermore an IO module may comprise one IO interface port or more IO interface ports and even may have a multiplexer electrically coupled with a plurality of IO interface ports to be multiplexed for data transmission over a common channel by a single IO module.

Hence the present invention offers the advantage that the two-wire loop process IO transmitter powered from the two-wire loop may be configured in a way that maximizes efficiency. As a result the modularly build up single two-wire loop process IO transmitter powered from the two-wire loop of the present invention solves problems of undue or wasted power due to unused complexity and/or IO interface ports and reduces the number of IO transmitters needed in order to capture IO process points. The IO transmitter hence functions on the two-wire loop as a single two-wire loop powered IO transmitter with a customizable functionality and scalability, which is achieved by distributing functionality throughout different modules.

The subsequent description relates to embodiments of a two-wire loop process IO transmitter powered from the two-wire loop, with the IO transmitter including at least two field-mountable modules connectable to each other and being intended for use in the process industry in accordance with the present invention.

Figure 3:
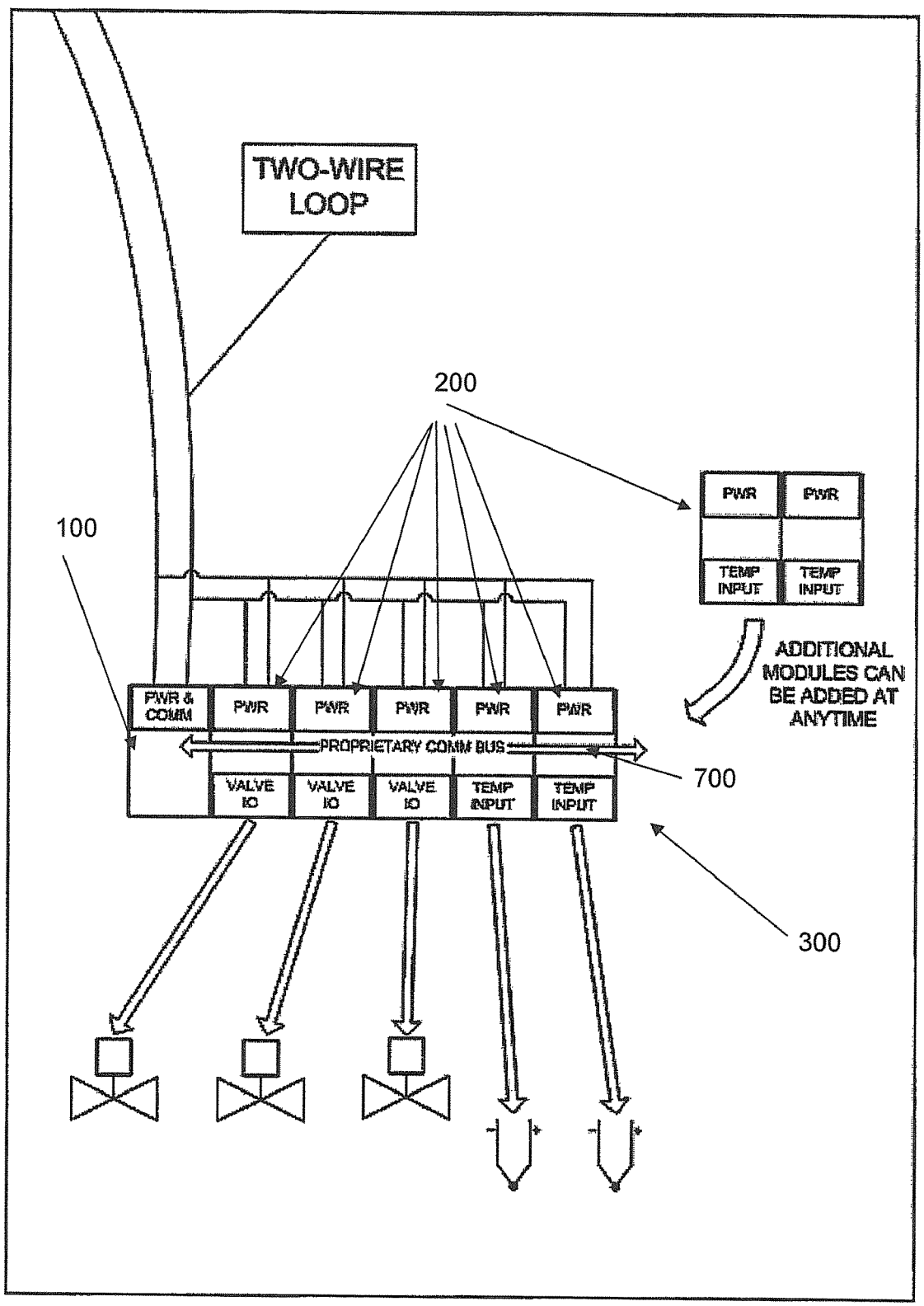
FIG. 3 is a simplified view of a single two-wire loop process IO transmitter powered from the two-wire loop according to an embodiment of the present invention, the single two-wire loop process IO transmitter powered from the two-wire loop is composed by one gateway module and five IO modules according to FIG. 1 or 2, and can be expanded by adding additional IO modules at any time.
Figure 4:
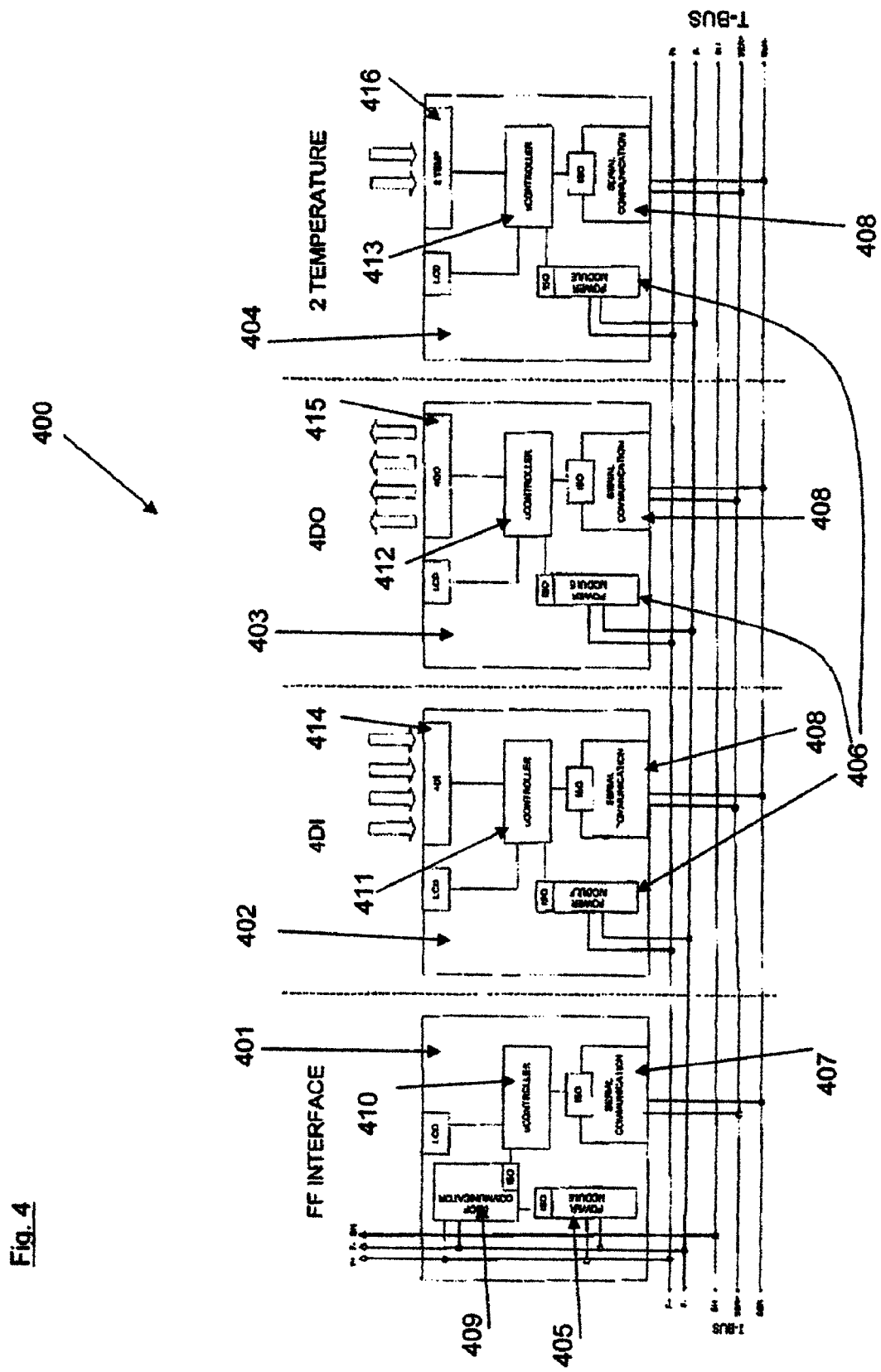
FIG. 4 is a block diagram of a single two-wire loop process IO transmitter powered from the two-wire loop in accordance with an embodiment of the present invention, the single two-wire loop process IO transmitter powered from the two-wire loop having a gateway module adapted for interfacing with the two-wire loop of a foundation fieldbus (FF) process control system and having three IO modules, each of the IO modules providing multiplexed IO interface ports for interfacing with IO field devices, all of the modules being modularly interconnected by means of a common backplane type connection system.
Figure 5:
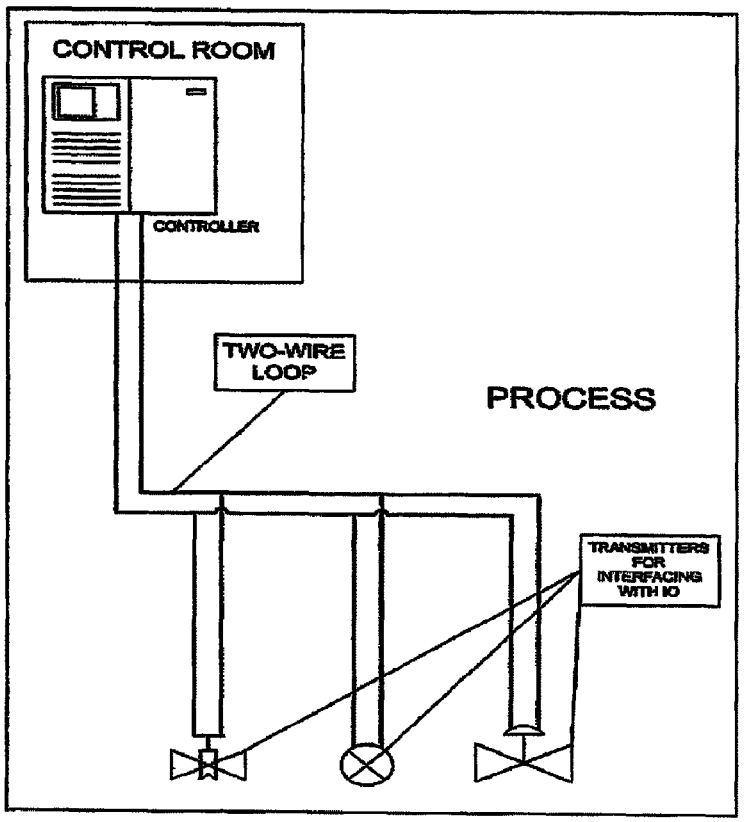
FIG. 5 shows a block diagram of three IO transmitters each of which connected to a common two-wire loop of a central controller for separately receiving power from and for separately communicating with the central controller located far away in a control room according to the state of the art.
Figure 6:
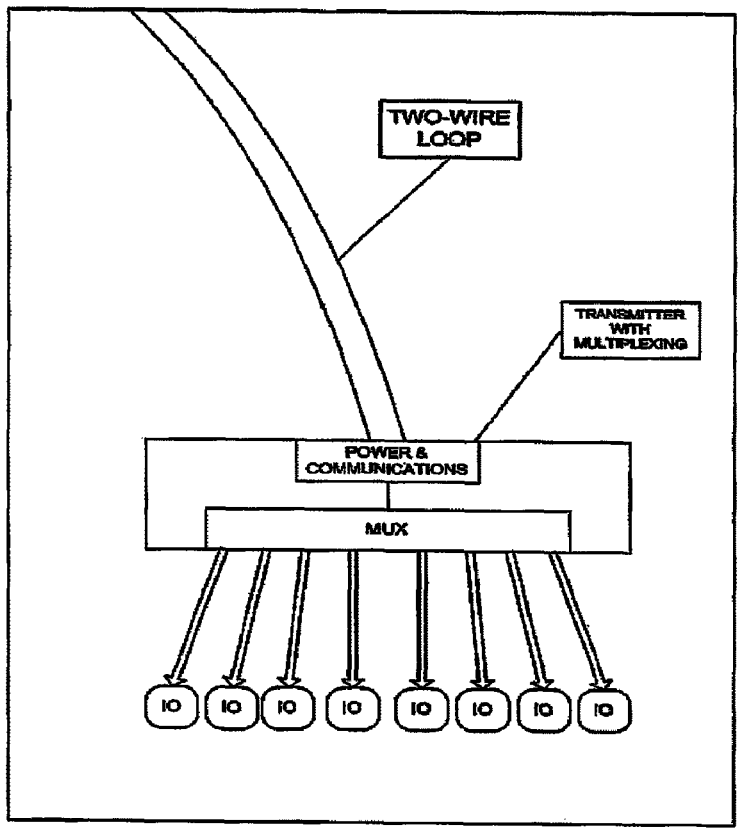
FIG. 6 is a block diagram depicting a single IO transmitter according to the state of the art and connected to a two-wire loop for receiving power from and for communicating with the central controller and having a multiplexer for multiplexing eight IO interface ports on a single channel as well as a single or common power circuit for wholly powering and communication with all of the eight IO interface ports with power received from the two-wire loop and a communication circuit handling the entire communication and data transfer.

As can been seen in FIGS. 3 and 4, each of which is showing an embodiment of a single transmitter according to the present invention, an inventive single two-wire loop process IO transmitter 300 or 400 powered from the two-wire loop is built up by a modular system consisting of a family of modules allowing a user to construct a single customized scalable loop-powered, two-wire process IO transmitter receiving power from the two-wire loop and communicating over said two-wire loop with a central controller being not depicted in FIGS. 3 and 4. Thus, the two-wire loop is designed such that a transmitter receives its power from the two-wire loop as well as communicates on the two wire loop, wherein the two-wire loop is designed such that communication may occur without disrupting the provision of power.

The modules used to built up the transmitter consist of two principle types. A first type is shown in FIG. 1, showing an embodiment of a gateway module 100. The gateway module 100 contains circuitry 101 constructed to communicate over a two-wire loop with a central controller being not depicted in FIG. 1 and a local circuitry 102 constructed to power itself from the two-wire loop without powering any other module from the two-wire process loop. The circuits being constructed to preferably operate on a two-wire loop being of a communication type in accordance with Foundation Fieldbus or with Profibus-PA but is not limited thereto. Furthermore, the gateway module 100 has a circuitry 103 to communicate with a number of 0 to N IO modules via a communication bus being a local bus separated from the two-wire-loop and which may be a proprietary communication bus 700. The circuitry 101 and the circuitry 103 are interconnected for organizing the communication between the gateway module 100 and the central controller and the communication between the gateway module 100 and the number of 0 to N IO modules.

Figure 2:
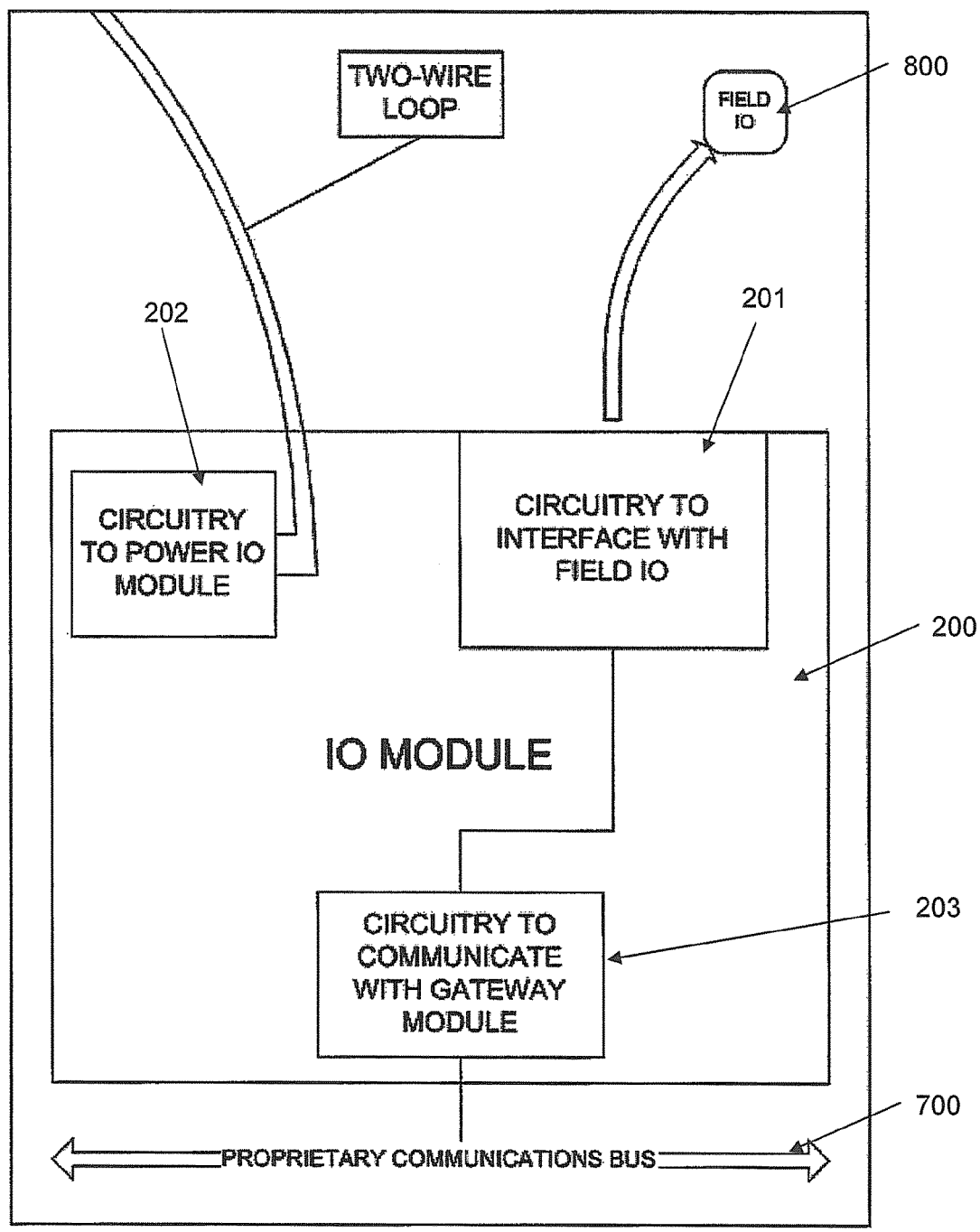
FIG. 2 is a block diagram of an IO module incorporated within a single two-wire loop process IO transmitter powered from the two-wire loop according to an embodiment of the present invention, the IO module comprises a circuitry to wholly power itself from a two-wire process loop without powering any other module from the two-wire process loop, a circuitry to communicate at least with a gateway module over a local bus separated from the two-wire loop and a circuitry to interface with at least one IO field device.

A second type is shown in FIG. 2, showing an embodiment of an IO module 200. The IO module 200 contains circuitry 201 constructed to interface to at least one IO field device 800 and a local circuitry 202 constructed to power itself from a two-wire loop without powering any other module from the two-wire process loop. The circuitry 202 being constructed to preferably operate on a two-wire loop being of a communication type in accordance with Foundation Fieldbus or with Profibus-PA but is not limited thereto. Furthermore, the IO module 200 has a circuitry 203 to communicate at least with a gateway module via a communication bus being a local bus separated from the two-wire-loop and which may be the proprietary communication bus 700. The circuitry 201 and the circuitry 203 are interconnected for organizing the communication between the TO module 200 and the at least one IO field device 800 and the communication between the IO module 100 and at least the gateway module.

It is mentioned, that the circuitry 201 of the IO module 200 may be constructed for interfacing to IO field devices types including for example one or more discrete input field devices, one or more discrete output field devices, one or more analog input field devices, one or more analog output field devices or any combination of IO field devices types. Moreover, the circuitry may incorporate a multiplexer to multiplex a plurality of IO interface ports on a single channel.

Preferably, as described in more detail below, the circuitry 202 to wholly power the module 200 and the circuitry 203 to communicate with at least with a gateway module are substantially isolated from the circuitry 201 to interface with at least one IO field device 800

Using such principle types of modules 100 and 200 for building up a single two-wire loop process IO transmitter powered from the two-wire loop according to embodiments of the present invention, a such transmitter is able to be configured as a single customized two-wire loop process IO transmitter powered from the two-wire loop to meet specific process application needs. A properly configured single two-wire loop process IO transmitter powered from the two-wire loop thus contains one gateway module 100 and a selectable number and combination of IO modules 200 interconnected to each other via the communication bus so that the gateway module processes the data from and to these IO modules and transmits the data on the two-wire loop between the transmitter and a central controller and each of the modules receives its power separately by the respective local power circuitry via the two-wire loop. Moreover and as a result, IO modules can be added to or taken away from an operational single transmitter at the users discretion and in principle at any time. Thus, the resulting single transmitter is a single two-wire process IO transmitter which is customizable, scalable and loop-powered. Based thereon, the single two-wire process IO transmitter can be optimized according to the specific application needs to merely consume power as necessary and thereby enabling more efficiency in multiplexing signals and a more maximized cable run length.

The customizable transmitter allows the user to define the number and types of IO point to be controlled and monitored and to communicate with the respective IO field devices, preferably by multiplexing, and to transmit the related data for controlling and monitoring over the two-wire loop while functioning as a single transmitter on the two-wire loop. The scalability also allows the definition of a process system that provides the needed IO interface ports with the most efficient current draw.

FIG. 3 is a simplified view of a single two-wire loop process IO transmitter 300 powered from the two-wire loop according to an embodiment of the present invention, wherein the single IO transmitter 300 includes one gateway module 100 and five IO modules 200 according to FIG. 1 or 2, and can be expanded by adding additional IO modules 200 at any time. Three of the IO modules 200 are exemplary constructed for interfacing with valves and two of the IO modules 200 are exemplary constructed for interfacing with temperature devices coupled to various IO points to be captured by a central controller not depicted. The communication between the IO modules 200 and the gateway module 100 is performed via a common communication bus being the proprietary communication bus 700 to which all modules are connected. As depicted, additional IO modules, for example two IO modules constructed for interfacing with temperature devices, can be added to the single transmitter 300 thereby enhancing the capacity of capturing IO points.

FIG. 4 shows a proposal of a further modularly built up and constructed single two wire loop process IO transmitter 400 powered from the two-wire loop according to the present invention. The modular IO transmitter 400 is constructed for example for use on a two-wire loop according to Foundation Fieldbus (FF). Accordingly, the single two-wire loop process IO transmitter 400 powered from the two-wire loop as depicted in FIG. 4 shows a gateway module 401 based on the type of gateway module 100 according to FIG. 1 and one or more input/output or IO modules based on the type of IO module 200 according to FIG. 2. According to FIG. 4 three IO modules 402, 403 and 404. Each of the modules 401 to 404 is connected to the two wires F+ and F− of the two-wire loop and to a serial communication bus being according to FIG. 4 a serial communication bus separated from the two wire loop. However, a common physical bus connection system may be used including data lines or wires and power lines or wires for separately carrying communication and power within one connection system. As a such physical bus connection system, a backplane type connection system, as described for example in EP 2053 697 or US 2009/0104814 or a similar connection system, may be used. Thus according to embodiments of the present invention, a physical connection system, referenced in FIG. 4 as "T-BUS", as described for example in EP 2053 697 or US 2009/0104814 is used and may supply all modules connected thereto with power and transmit data between said modules. In case a module is detached from the T-BUS the power supply and data transmission connection between the remaining modules still exists. Thus, in case the T-BUS for example is used for providing the communication bus separated from the two wire loop, the two wires F+ and F− of the two-wire loop can be easily connected with the power supply wires of the T-BUS and the T-BUS wires marked with SER+ and SER− are used for transmitting data. Depending on application specific needs, a fifth wire SH of the T-BUS as depicted in FIG. 4 may be used for synchronization for example or may be unused.

Each of the modules contains its own local power circuitry 405 or 406, respectively designed in FIG. 4 as a power module, and draws its own power necessary from the two-wire loop. Thus each local power circuitry 405 or 406 is electrically connected to the wires F+ and F−. Each of the modules contains its own communication circuitry 407 or 408, being respectively designed in FIG. 4 for serial communication, and communicates with the other modules of the single transmitter by using the serial communication bus via the wires SER+ and SER− upon respective electrically connection therewith. Only the gateway module 401 provides the interface to and communicates with a central controller or host over the two-wire loop.

The IO transmitter 400 as depicted in FIG. 4 hence, is modularly built up and functions on the two-wire loop as a single two-wire loop process IO transmitter powered from the two-wire loop with the gateway module 401 processing data from and to a user defined combination of input and/or output (IO) modules. Each module may have a local indication for the user, such as a LCD, for locally indicating to the user a proper or fault function. The IO modules, can be added or removed from the operation at the users discretion. This architecture provides a customizable and scalable single two-wire loop process IO transmitter powered from the two-wire loop.

In more detail, the gateway module 401 includes in addition to the power module 405 coupled to the two-wire loop and in addition to the serial communication circuitry 407 to communicate with a number of IO modules a circuitry to communicate on the two-wire process loop with the controller. According to FIG. 4 said circuitry to communicate on the two-wire process loop with the controller includes a loop communicator 409 coupled to the two wire control loop and is adapted for bi-directional communication over the loop. The loop communicator 409 can include a communication device such as Foundation Fieldbus communication controller or the like and may include a suitable isolation circuitry for complying with intrinsic safety requirements. The loop communicator 409 and the serial communication circuitry 407 to communicate with a number of IO modules are interconnected by a controller 410 for organizing the entire communication and may provide configuration information to be forwarded based on information received via the process loop and/or by the IO modules. For powering the entire gateway module 401 the power module 405 is electrically connected with the loop communicator 409, the controller 410 and the serial communication circuitry 407. In this regard, preferably each connection between these entities are provided at least via corresponding power isolators, for example a transformer or any suitable device, labeled in FIG. 4 with ISO. It is mentioned that even a communication isolator can be combined together with a respective power isolator in a single circuit if it is suitable based on application needs. Thus, the electrical isolation ISO ensures, that undesirable loop errors are avoided. For signaling the user a proper or fault function of the gateway module 401, a LCD signaling device is coupled to the controller 410.

Examples of IO modules according to FIG. 4 include a digital input module 402 having a circuitry 414 constructed to interface with certain IO field devices and providing four digital input interface ports 4DI, a digital output module 403 having a circuitry 415 constructed to interface with certain IO field devices and providing four digital output interface ports 4DO and a analog input module 404, such as a temperature input module, having a circuitry 416 constructed to interface with certain temperature field devices and providing for example two analog input interface ports 2TEMP. The IO modules thus interface with the process to receive variable field inputs, such as from proximity sensors connected to the circuitry 414 of IO module 402 or thermocouplers connected to the circuitry 416 of IO module 404, and provide process control and data outputs, such as via valve actuators connected to circuitry 415 of IO module 403, for controlling and monitoring several IO process points.

In more detail, each IO module 402, 403, 404 includes in addition to the local power module 406 coupled to the two-wire loop, in addition to the serial communication circuitry 408 to communicate at least with the gateway module 410 and in addition to the circuitry 414, 415 or 416 constructed to interface with certain IO field devices merely a local controller 411, 412 or 413 but not a loop communicator as the gateway module 410 communicates with the loop. Each local controller 411, 412 and 413 is connected to the respective serial communication circuitry 408 and to the respective local power module or circuitry 406. Thus each IO module 402, 403 and 404 is powered by its own local power module or circuitry 406 receiving power via the two-wire loop.

Furthermore, the circuitry 414, 415 and/or 416 of the IO module 402, 403 or 404 may be alternatively constructed for interfacing to different IO field devices types including for example one or more discrete input field devices, one or more discrete output field devices, one or more analog input field devices, one or more analog output field devices or any combination of IO field devices types. Moreover, the circuitry 414, 415 and/or 416 may incorporate a multiplexer to multiplex a plurality of IO interface ports on a single channel.

Moreover, the communication between the IO modules 402, 403 or 404 and the gateway module 401 is ensured via the serial communication bus as each respective serial communication circuitry 408 or 407 is connected to the two wires SER+ and SER− of the communication bus.

In this regard, each serial communication circuitry 407 and 408 is adapted for bi-directional communication over the communication bus. Each local controller 411, 412 and 413 is designed for locally organizing the communication of a respective IO module 402, 403 or 404 and may also provide processed information to be forwarded based on information received via the communication bus and/or via the circuitry 414, 415 or 416.

Moreover due to the local controllers 411, 412 and 413 of the IO modules 402, 403 and 404 numerous applications such as local control, input and/or output processing can be provided by easily changing the firmware of a local controller. As a result, due to the respective local controller 411, 412 and 413, the IO modules 402, 403 and 404 may be supplemented by the capability to communicate with each other IO module and between each other via the serial communication bus without the need to incorporate always the gateway module 410.

Again, the connections of an IO module 402, 403 or 404 between the local controller 411, 412 or 413, the respective serial communication circuitry 408 and to the respective local power module or circuitry 406 is provided at least via a corresponding power isolator, for example a transformer or any suitable device, labeled in FIG. 4 with ISO. It is mentioned that even a communication isolator can be combined together with a respective power isolator in a single circuit if it is suitable based on application needs. Thus, even the IO module interfaces to the IO field provided by the circuitry 414, 415 or 416 are substantially isolated from the two-wire process loop according to the embodiment as described. Hence, with regard to each IO module, the circuitry to wholly power itself and the circuitry to communicate with at least with a gateway module are substantially isolated from the circuitry to interface with at least one IO field device. For locally indicating to the user a proper or fault function of the IO module 402, 403 or 404, a LCD indication device respectively is coupled to the controller 411, 412 or 414.

As mentioned, in case a connection system like the referenced T-BUS system is used for providing the communication bus, all modules connected thereto may transmit data between said modules and may supplied with power received via the two wires of the two-wire process loop electrically connected with the bus power lines or wires. Thus within a common section of the physical connection system only one gateway module 401 is needed and in principal any additional IO modules according to the present invention can be added to prolong the common T-BUS section by the use of corresponding T-BUS connector (not depicted) described for example in EP 2053 697 or US2009/0104814.

Thus, in case the controller 410 of the gateway module 401 can control the communication between a maximum number of IO modules and a such maximum number of IO modules is reached, a further gateway module could be necessary to be coupled to the two-wire process loop to start a new common T-BUS section.

The present invention is not limited to the embodiments described herein; reference should be had to the appended claims.

What is claimed is:

1. A two-wire process input-output ("IO") transmitter powered by a two-wire process loop and configured as a single transmitter, the transmitter comprising:
   a gateway module; and
   at least one local IO module,
   the gateway module including a first circuit configured to wholly power the gateway module from the two-wire process loop without powering any other module from the two-wire process loop, a second circuit configured to communicate via the two-wire process loop, and a third circuit configured to communicate with the at least one IO module via a local bus separated from the two-wire process loop,
   each of the at least one local IO module including a first circuit configured to wholly power the respective local IO module from the two-wire process loop without powering any other module from the two-wire process loop, a second circuit to communicate at least with the gateway module via the local bus, and a third circuit configured to interface with at least one IO field device.

2. The transmitter as recited in claim 1, wherein the third circuit of each of the at least one local IO module is substantially isolated from the two-wire process loop.

3. The transmitter as recited in claim 1, wherein the first circuit of the gateway module and the first circuit of each of the at least one local IO module is configured to operate on a two-wire loop utilizing at least one of a Foundation Fieldbus and a Profibus-PA protocol.

4. The transmitter as recited in claim 1, wherein the second circuit of the gateway module is configured to operate on a two-wire loop utilizing at least one of a Foundation Fieldbus and a Profibus-PA protocol.

5. The transmitter as recited in claim 1, wherein each of the third circuit of the gateway module and the second circuit of each of the at least one local IO module is configured to communicate via a common communication bus.

6. The transmitter as recited in claim 5, wherein the communication bus includes a serial communication bus.

7. The transmitter as recited in claim 6, further comprising a backplane connection system configured to transmit communications via the serial communication bus.

8. The transmitter as recited in claim 6, wherein a common portion of a physical connection system configured to transmit communications via the serial communication bus requires a single gateway module.

9. The transmitter as recited in claim 8, wherein the transmitter is configured to receive additional local IO modules so as to extend the common portion of the physical connection system.

10. The transmitter as recited in claim 1, wherein the first and second circuits of each of the at least one local IO module are substantially isolated from the third circuit of the respective local IO module.

11. The transmitter as recited in claim 1, wherein the third circuit of each of the at least one local IO module is configured to interface with at least one of an analog input field device, a discrete input field device, an analog output field device, and a discrete output field device.

12. The transmitter as recited in claim 11, wherein the third circuit of each of the at least one local IO module includes a multiplexer configured to multiplex a plurality of IO interface ports to a single channel.

13. The transmitter as recited in claim 1, wherein the second and third circuits of the gateway module are coupled so as to process communications.

14. The transmitter as recited in claim 13, wherein the second and third circuits of the gateway module are coupled via a controller.

15. The transmitter as recited in claim 14, wherein the second circuit of the gateway module and the controller are electrically coupled to the first circuit of the gateway module.

16. The transmitter as recited in claim 15, wherein the electrical coupling includes power isolators.

17. The transmitter as recited in claim 16, wherein a communication isolator and the power isolator are integrated into a circuit.

18. The transmitter as recited in claim 1, wherein the second circuit of the gateway module is configured to communicate with a central process controller.

19. The transmitter as recited in claim 1, wherein the second circuit of the gateway module includes a loop communicator coupled to the two-wire process loop and is configured for bi-directional communication over the two-wire process loop.

20. The transmitter as recited in claim 1, wherein each of the at least one local IO module includes a local controller coupled to the first, second, and third circuits of the respective local IO module.

21. The transmitter as recited in claim 20, wherein the local controller is configured to supplement the third circuit of the gateway module.

22. The transmitter as recited in claim 20, wherein the coupling of the local controller to the first and second circuits of each of the at least one local IO module includes a power isolator.

* * * * *